US007983246B2

(12) United States Patent
Lee

(10) Patent No.: US 7,983,246 B2
(45) Date of Patent: Jul. 19, 2011

(54) MULTIMEDIA ACCESS SYSTEM

(75) Inventor: Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1559 days.

(21) Appl. No.: 11/312,015

(22) Filed: Dec. 19, 2005

(65) Prior Publication Data

US 2006/0165083 A1 Jul. 27, 2006

(30) Foreign Application Priority Data

Dec. 20, 2004 (KR) .................. 10-2004-0108924
Dec. 21, 2004 (KR) .................. 10-2004-0109749

(51) Int. Cl.
*G06F 15/16* (2006.01)
*H04L 12/28* (2006.01)
*H04L 12/66* (2006.01)

(52) U.S. Cl. ........ 370/352; 370/392; 709/203; 709/217; 709/219; 709/226; 709/231

(58) Field of Classification Search .......... 370/225–463; 709/203–231
See application file for complete search history.

(56) References Cited

U.S. PATENT DOCUMENTS

| | | | | |
|---|---|---|---|---|
| 6,615,212 B1* | 9/2003 | Dutta et al. | .................. | 707/10 |
| 6,826,173 B1* | 11/2004 | Kung et al. | .................. | 370/352 |
| 6,850,252 B1* | 2/2005 | Hoffberg | .................. | 715/716 |
| 6,879,581 B1* | 4/2005 | Leung | .................. | 370/352 |
| 6,888,477 B2* | 5/2005 | Lai et al. | .................. | 341/50 |
| 6,922,726 B2* | 7/2005 | Basson et al. | .................. | 709/227 |
| 6,965,926 B1* | 11/2005 | Shapiro et al. | .................. | 709/219 |
| 7,013,289 B2* | 3/2006 | Horn et al. | .................. | 705/26 |
| 7,013,424 B2* | 3/2006 | James et al. | .................. | 715/239 |
| 7,092,375 B2* | 8/2006 | Pitsoulakis | .................. | 370/338 |
| 7,137,072 B2* | 11/2006 | Bauer et al. | .................. | 715/809 |
| 7,142,509 B1* | 11/2006 | Rovner et al. | .................. | 370/230 |
| 7,155,415 B2* | 12/2006 | Russell et al. | .................. | 705/59 |
| 7,171,018 B2* | 1/2007 | Rhoads et al. | .................. | 382/100 |
| 7,207,041 B2* | 4/2007 | Elson et al. | .................. | 718/104 |
| 7,213,766 B2* | 5/2007 | Ryan et al. | .................. | 235/492 |
| 7,277,434 B2* | 10/2007 | Astarabadi et al. | .................. | 370/389 |
| 7,299,259 B2* | 11/2007 | Petrovykh | .................. | 709/205 |
| 7,308,487 B1* | 12/2007 | Dansie et al. | .................. | 709/219 |
| 7,359,371 B2* | 4/2008 | Emley et al. | .................. | 370/352 |
| 7,411,939 B1* | 8/2008 | Lamb et al. | .................. | 370/352 |
| 7,451,921 B2* | 11/2008 | Dowling et al. | .................. | 235/380 |
| 7,593,576 B2* | 9/2009 | Meyer et al. | .................. | 382/190 |
| 7,711,564 B2* | 5/2010 | Levy et al. | .................. | 704/270 |
| 2002/0105529 A1* | 8/2002 | Bowser et al. | .................. | 345/629 |
| 2002/0124100 A1* | 9/2002 | Adams | .................. | 709/232 |
| 2002/0156909 A1* | 10/2002 | Harrington | .................. | 709/231 |
| 2002/0165912 A1* | 11/2002 | Wenocur et al. | .................. | 709/203 |

(Continued)

FOREIGN PATENT DOCUMENTS

| | | |
|---|---|---|
| WO | 01/08150 | 2/2001 |
| WO | 03/040893 | 5/2003 |
| WO | WO 2005043911 A1 * | 5/2005 |

*Primary Examiner* — Ayaz R Sheikh
*Assistant Examiner* — Venkatesh Haliyur
(74) *Attorney, Agent, or Firm* — Lee, Hong, Degerman, Kang & Waimey

(57) ABSTRACT

A multimedia access system includes: a database including user equipment spec information; an application server for transcoding multimedia data to be transmitted in accordance with user equipment spec information of a receiver side in the database; and an addressing unit for addressing a transmission packet so that that the multimedia data to be transmitted is transcoded by the application server.

2 Claims, 9 Drawing Sheets

U.S. PATENT DOCUMENTS

| | | | |
|---|---|---|---|
| 2004/0044740 A1* | 3/2004 | Cudd et al. | 709/217 |
| 2004/0054780 A1* | 3/2004 | Romero | 709/226 |
| 2005/0060436 A1* | 3/2005 | Kienhoefer | 710/1 |
| 2005/0114711 A1* | 5/2005 | Hesselink et al. | 713/201 |
| 2005/0278418 A1* | 12/2005 | Rathakrishnan et al. | 709/203 |
| 2007/0226770 A1* | 9/2007 | Kim et al. | 725/139 |

* cited by examiner

MULTIMEDIA ACCESS SYSTEM

This application claims the benefit of the Korean Patent Application Nos. 10-2004-0108924 and 10-2004-0109749, filed on Dec. 20, 2004 and Dec. 21, 2004, respectively, the contents of which are hereby incorporated by reference herein in their entirety.

BACKGROUND OF THE INVENTION

1. Field of the Invention

The present invention relates to an adaptive universal multimedia access (UMA) system of user equipment for multimedia resource in an Internet protocol multimedia subsystem (IMS) environment.

2. Description of the Related Art

Various IP based multimedia services are provided to a notebook environment and a personal digital assistant (PDA) environment based on a wireless local area network (WLAN). Accordingly, various researches are actively in progress to graft a mobile communication technology onto an IP based environment.

An Internet protocol multimedia subsystem (IMS) is a representative one among the introduced method of grafting the mobile communication technology onto the IP based environment. The IMS was introduced by the $3^{rd}$ generation partnership project (3GPP) which is the European $3^{rd}$ generation mobile communication standard. The IMS discloses a method of receiving an IP based service through a wireless communication terminal such as a mobile phone or a cellular phone.

The IMS allows the wireless communication terminal to receive various visual communication services such as a visual communication, a video chatting and a video conference and to use a game service, which include not only voice service but also image or graphic services.

Hereinafter, the Internet protocol (IP) multimedia subsystem (IMS) environment will be briefly described.

The IMS is a communication standard introduced by the $3^{rd}$ generation partnership project (3GPP) to support various services by connecting a wireless mobile communication terminal to an IP network capable of providing plenty of services.

The IMS defines how to connect terminals to the IP network through a server and how to select a server to connect the terminals to the IP network. That is, the IMS defines components and sequence of processes required to connect the terminals to the IP network.

FIG. 1 is a schematic diagram of an IP multimedia subsystem (IMS).

Referring to FIG. 1, the IMS includes an application server 10, a home subscriber server (HSS) 20, a call session control function (CSCF) 30, a mobile communication network (3G)/general packet radio service (GPRS)/CDMA 40, a user equipment (UE) 50, a media gateway control function (MGCF) 60, a media gateway (MGW) 70 and a public switched telephone network (PSTN) 80.

The HSS 20 is a master database for a user. That is, the HSS 20 stores information of subscribers and provides information of corresponding subscriber according to a request.

The CSCF 30 controls a gateway and an incoming call, manages serving profiles and performs operations for address processing. According to the functions, the CSCF 30 is divided into a proxy-CSCF (P-CSCF), an interrogating-CSCF (I-CSCF) and a serving-CSCF.

The P-SCSF functions as a connecting point when the UE 50 accesses the IMS through the GPRS 40.

The I-SCSF functions as a connecting point for delivering all incoming calls to subscribers in the own network and as a connecting point for connecting the subscribers in the own network to subscribers in other network. The I-CSCF selects the S-SCSF by inquiring corresponding information to the HSS 20 and allocates the S-CSCF to the UE 50 while registering.

The S-CSCF performs major functions for processing calls.

The MGCF 60 performs a signaling transformation on data transmitted from the external PSTN 80 to the IMS and forwards a transformed request message to the S-SCSF. Also, the MGCF 60 controls the MGW 70.

The MGW 70 functions for connecting the wireless terminals to the PSTN 80. In order to cooperate with the PSTN 80, the MGW 70 transcodes an IP packet type media data for the IMS to a predetermined format suitable for the PSTN 80.

A gateway GPRS system node (GGSN) 41 is a gateway between a wireless switching network and an Internet network so that a wireless terminal transmits/receives data to/from a destination in the general Internet network through the wireless switching network having a base station. A serving GPRS support node (SGSN) 42 traces a mobile node and performs operations as a tunnel exchanging a packet with the GGSN.

Terminals in the IMS shown in FIG. 1 are allowed to connect different home networks. That is, the terminals and the home network are connected through a mobile communication network, GGSN 41 and SGSN 42. In order to communicate with other terminal, a session is connected at first. After connecting the session, the terminals transmit and receive data one another.

As illustrated in FIG. 1, the transmitting terminal 50 includes an application 51 related to mobile communication, a protocol stack 52 for performing a sequence of control operations for communication control, a transmitting/receiving module 53 for transmitting/receiving data, a codec 54 for encoding/decoding data, and a display 55.

The protocol stack 52 includes a session initialization protocol (SIP) for connecting a session and a protocol stack configured of a real time transport protocol (RTP)/real time control protocol (RTCP), a user datagram protocol (UDP)/transmission control protocol(TCP) and an Internet protocol (IP) for transmitting media. Since these protocol stacks are well known to those skilled in the art, a detail description thereof will be omitted.

In the IMS environment illustrated in FIG. 1, the UE 50, i.e., a mobile terminal, accesses to the CSCF 30 that is an interface of an IP core network using the GGSN41/SGSN42 of a related art mobile communication network. The UE 50 receives various services from the IP core network by cooperating with the application servers 10 providing various applications and the HSS 20 managing user information as a database through the CSCF 30. Since the IMS specification document describes detail information of each component, a detail description thereof will be omitted.

The standard introduces a basic architecture as described above. For example, the standard defines specifications about signaling with the CSCF 30. Specifications about application are not well defined in the standard. That is, the application is developed according to each developer.

Mobile terminals are manufactured with various sizes of displays from a size of 128×96 to a size of 640×480 that is VGA level display. Also, mobile terminals are manufactured to include various types of decoders to recover and reproduce audio or video data. For example, as a standard for image data, MPEG1, MPEG2, MPEG4, H.263 and H.264 are used.

As a standard for audio data, G.711, G.726, audio modem riser (ARM), advanced audio codec, and MPEG1 layer 3 (MP3) are used.

However, the mobile terminal cannot include all of standard decoders because of limited resources. The mobile terminal generally includes predetermined decoders selected by the manufacturer. Some of mobile terminal may include non-standard CODEC. Therefore, mobile terminals manufactured for different mobile communication service providers are not comparable one another. If a spec of transmitting terminal and a spec of receiving terminal are different, there is a problem arisen to reproduce multimedia data from one terminal at other terminal. For example, if the transmitting terminal has a better spec than the receiving terminal, the receiving terminal cannot reproduce the multimedia data transmitted from the transmitting terminal to display image data or to reproduce audio data.

If the transmitting terminal transmits image data based on a QVGA resolution, 320×240, and the receiving terminal supports only a QCIF resolution, 176×144, then the receiving terminal cannot display the image data transmitted from the transmitting terminal. Accordingly, the receiving terminal wastes it's resource to receive useless image data.

As another example, if the transmitting terminal records a QVGA level of moving image at 30 fps and transmits the recorded moving image to the receiving terminal supporting only a QVGA level of moving image at 7.5 fps, the receiving terminal displays the moving image transmitted from the transmitting terminal in a four times slower speed because the receiving terminal has ¼ performance of reproducing the moving image compared to the transmitting terminal.

SUMMARY OF THE INVENTION

Accordingly, the present invention is directed to a multimedia access system that substantially obviate one or more problems due to limitations and disadvantages of the related art.

An object of the present invention is to provide a system capable of implementing a universal multimedia accessible environment in an IMS environment defined by the 3GPP standard, such that multimedia services can be provided according to the different mobile terminals.

Another object of the present invention is to provide an adaptive transcoding system of a user equipment, capable of providing multimedia resource services with the optimal image quality and cost by adaptively adjusting the incoming multimedia according to the display size of the user equipment or the supportable moving picture spec.

A further another object of the present invention is to provide a system capable of providing a component plug-in such that a corresponding decoder can be downloaded in real time and executed when multimedia with a format requiring a decoder that is not included in the user equipment is transmitted.

A still further object of the present invention is to provide a plug-in service apparatus and a mobile terminal using the same, capable of downloading programs necessary in the mobile terminal in real time so as to transmit/receive the services in a state in which it is compatible between mobile terminals manufactured of different companies and mobile terminals of difference service providers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a multimedia access system including: a database including user equipment spec information; an application server for transcoding multimedia data to be transmitted in accordance with user equipment spec information of a receiver side in the database; and an addressing unit for addressing a transmission packet so that that the multimedia data to be transmitted is transcoded by the application server.

In another aspect of the present invention, there is provided a multimedia access system including: a user equipment having its own spec information and transmitting the spec information; an application server for receiving spec information from the user equipment of a receiver side, and transcoding multimedia data to be transmitted in accordance with the received spec information; and an addressing unit for addressing a transmission packet so that that the multimedia data to be transmitted is transcoded by the application server.

In a further another aspect of the present invention, there is provided a multimedia access method including: recognizing spec information of a user equipment of a receiver side when multimedia data are transmitted; adaptively transcoding the multimedia data in accordance with the recognized spec of the user equipment of the receiver side; and transmitting the transcoded multimedia data.

In a further aspect of the present invention, there is provided a plug-in service device including: a database for managing a plug-in software; a plug-in application server for determining where or not a user equipment needs the plug-in software and transmitting the corresponding plug-in software.

In a further aspect of the present invention, there is provided a user equipment including: a spec storage for storing spec information; a spec generating module for generating and transmitting spec information in a data format suitable for transmission to an application server of a mobile communication system; and a module for receiving and executing a plug-in software transmitted from a plug-in server.

In a further aspect of the present invention, there is provided a plug-in service method including: determining whether or not data transmitted from a user equipment of a transmitter side can be processed by a user equipment of a receiver side; determining a processible plug-in software when the data transmitted from the user equipment of the transmitter side is processible by the user equipment of the receiver side; and transmitting the determined plug-in software to the user equipment of the receiver side.

In another aspect of the present invention, there is provided a plug-in service method including: requesting a session initialization for communication between a user equipment of a transmitter side and a user equipment of a receiver side; transmitting, at the user equipment of the receiver side, a message including a user equipment ID of the receiver side upon acceptance of the session; transmitting data of the user equipment of the transmitter side; searching, at a plug-in server, the spec information of the user equipment having a corresponding ID from a database; analyzing, at the plug-in server, the searched spec and transmission data and determining whether a plug-in service is needed; and transmitting a plug-in software from the plug-in server to the user equipment of the receiver side when the plug-in service is needed.

In a further aspect of the present invention, there is provided a plug-in service method including: determining, at a user equipment of a receiver side, whether or not a plug-in service is needed; requesting, at the user equipment of the receiver side, plug-in software from the plug-in server when plug-in service is needed; transmitting the corresponding plug-in software from the plug-in server to the user equipment of the receiver side in response to the request of the user equipment of the receiver side; and processing, at the receiving user equipment, the transmitted data by executing the transmitted plug-in software.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the embodiments of a universal multimedia access system in an IMIS environment will be described in detail with reference to the accompanying drawings.

In order to explain the characteristics when a transcoding service is applied to the IMS environment, a general procedure for the transcoding service will be schematically described below.

First, when data transmission is performed, a server obtains a user equipment (UI) spec information of a receiver side, and the received data is converted according to the UI spec of the receiver side. Then, the converted data is transmitted to the receiver side. In order for the transcoding service, an application server including a transcoder has to know the UI spec information. At this point, the UI spec can be obtained using an HSS and an SIP.

[Method Using HSS]

Figure 2:
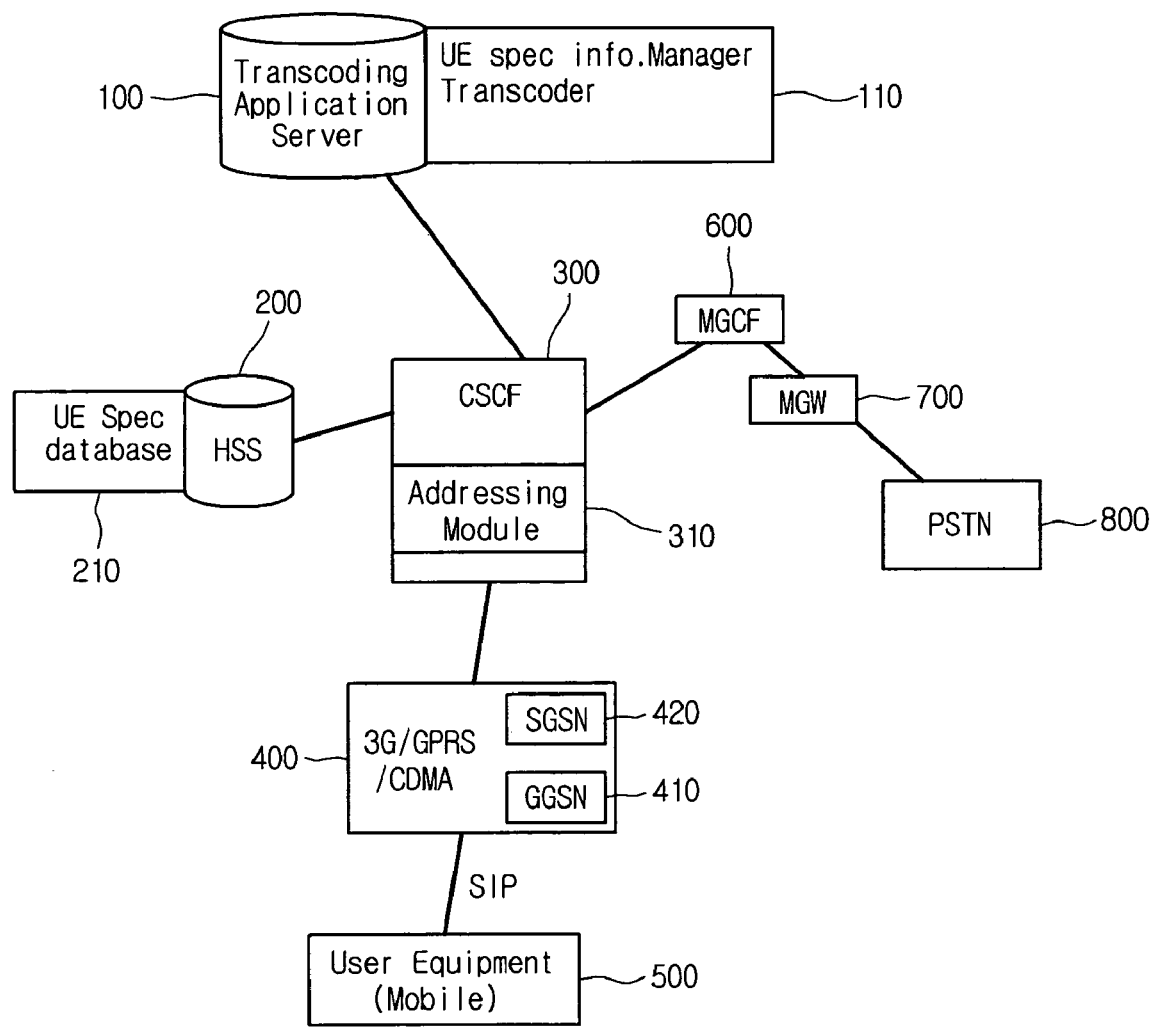
FIG. 2 is a diagram illustrating a configuration of an IMS system according to an embodiment of the present invention.

FIG. 2 is a diagram illustrating a configuration of a universal multimedia access system using an HSS according to an embodiment of the present invention. Referring to FIG. 2, the universal multimedia access system in the IMS environment according to the present invention includes a transcoding application server 100, an HSS 200, a CSCF 300, a mobile communication network 400, an UE 500, an MGCF 600, an MGW 700, and a PSTN 800.

The application server 100 is a transcoding application server and includes an UE spec information manager and transcoder 110. The HSS 200 includes an UE spec database 210, and the CSCF 300 includes an addressing module 310.

The HSS 200 has a subscriber information and provides it according to a request, and the CSCF 300 performs an incoming gateway, a call control, a serving profile management and address handling function, and so on. The MGCF 600 manages the transmission control with an external public switched telephone network (PSTN) 800. The MGW 700 connects the MGCF 600 to the PSTN 800. When a wireless terminal intends to perform a high speed packet communication, the GGSN 410 acts as a gateway to connect the wireless switching network to the Internet network so as to enable the packet to pass through the wireless switching network, including a base station, and then connect to the general Internet network, such that a data communication with a destination is possible. The SGSN 420 traces a mobile node and is a channel through which it transmits/receives a packet to/from the GGSN.

In the IMS of FIG. 2, each of the terminals can be connected to different home networks. The terminals and the home networks are connected together through the GGSN 410 and the SGSN 420. In order for the transmission/reception with different terminals, a session has to be connected. After the session connection, the data transmission/reception are actually possible.

As described above, the HSS 200 is a master database storing user information. Accordingly, the UE spec database 210 can be configured to record the UE spec in the HSS 200. The application server 100 interfaces with the CSCF 300 and reads the UE spec of the receiver side from the UE spec database 210, and then converts the data to be transmitted according to the corresponding spec. In this case, since the UE 500 can be changed, the information stored in the UE spec database 210 of the HSS 200 has to be updated. The update of the UE spec information recorded in the UE spec database 210 of the HSS 200 can be achieved by transmitting the corresponding update information an SIP used to initialize the session when the UE 500 begins the transmission/reception. That is, the update of the UE spec information can be achieved by recording the update information of the UE in a specific field of the SIP, reflecting it to the UE spec database 210 of the HSS 200, and modifying the spec information of the corresponding UE.

Figure 1:
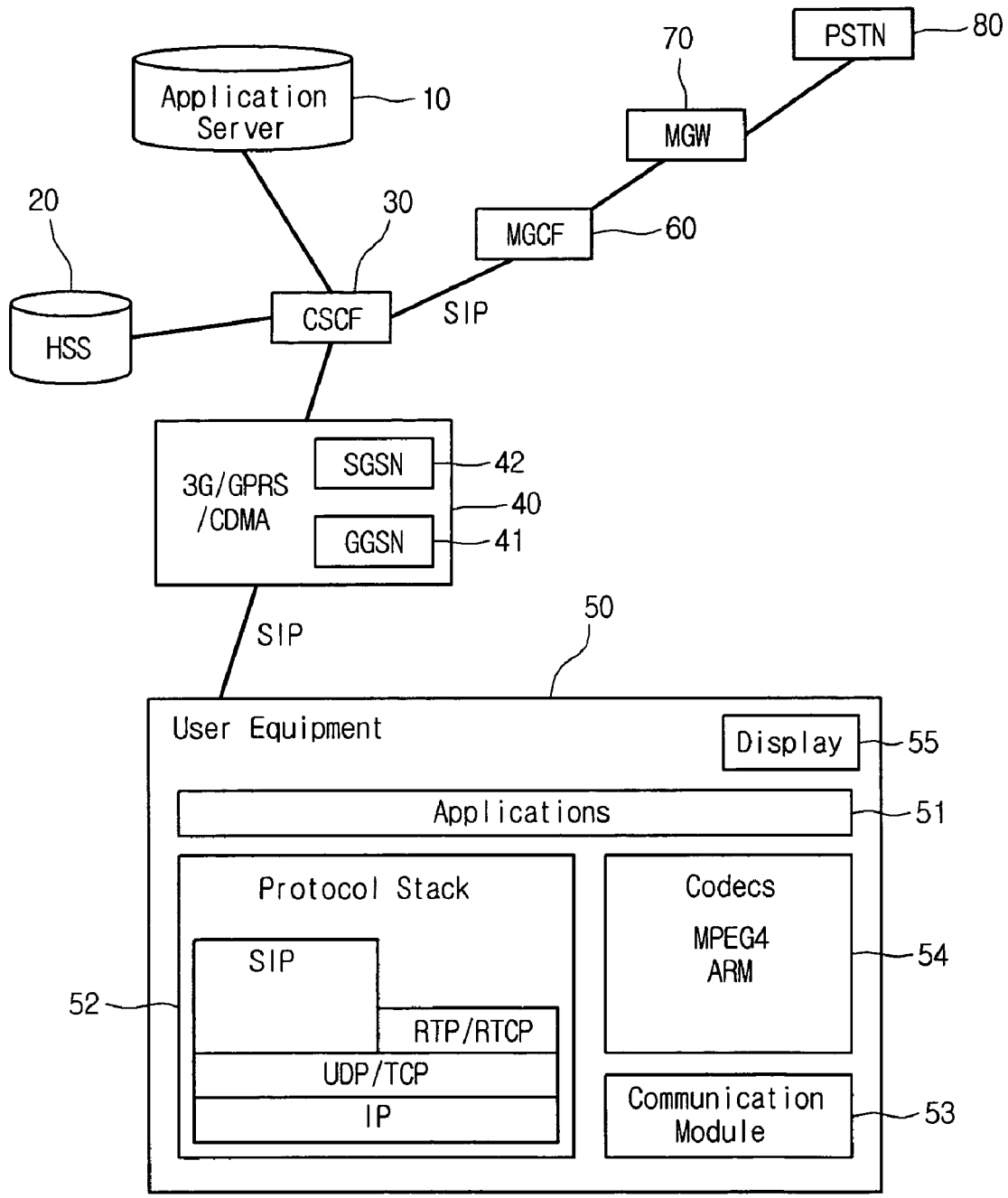
FIG. 1 is a schematic diagram of an IP multimedia subsystem (IMS)

The UE 500 includes an operation of connecting the session in order for data transmission/reception, and an RTP/RTCP that is a protocol used to transmit/receive actual data. This has been already described above with reference to FIG. 1. The SIP and the RTP/RTCP corresponds to a session layer in seven network layers defined in an OSI, and the UDP or TCP correspond to an actual transmission layer. Also, the IP corresponds to a network layer.

Like this, in order to transcode the TX data, a routing address in the packet has to be changed so as to enable the data to always pass through the server, such that the application server takes the transmission data packet and transcode it. For this service, an addressing module 310 is included in the IMS and makes the UE 500 set a routing address of each packet so as to pass through the corresponding application server.

FIG. 2 illustrates the case where the addressing module 310 is included in the CSCF 300. Also, the transcoding application server 100 includes a module for read the UE spec from the HSS 200 and analyzing it, and a transcoding module for transcoding the TX data according to the analyzed UE spec. In FIG. 2, the modules are represented by an UE spec information manager and transcoder 110.

[Method Using SIP]

Figure 3:
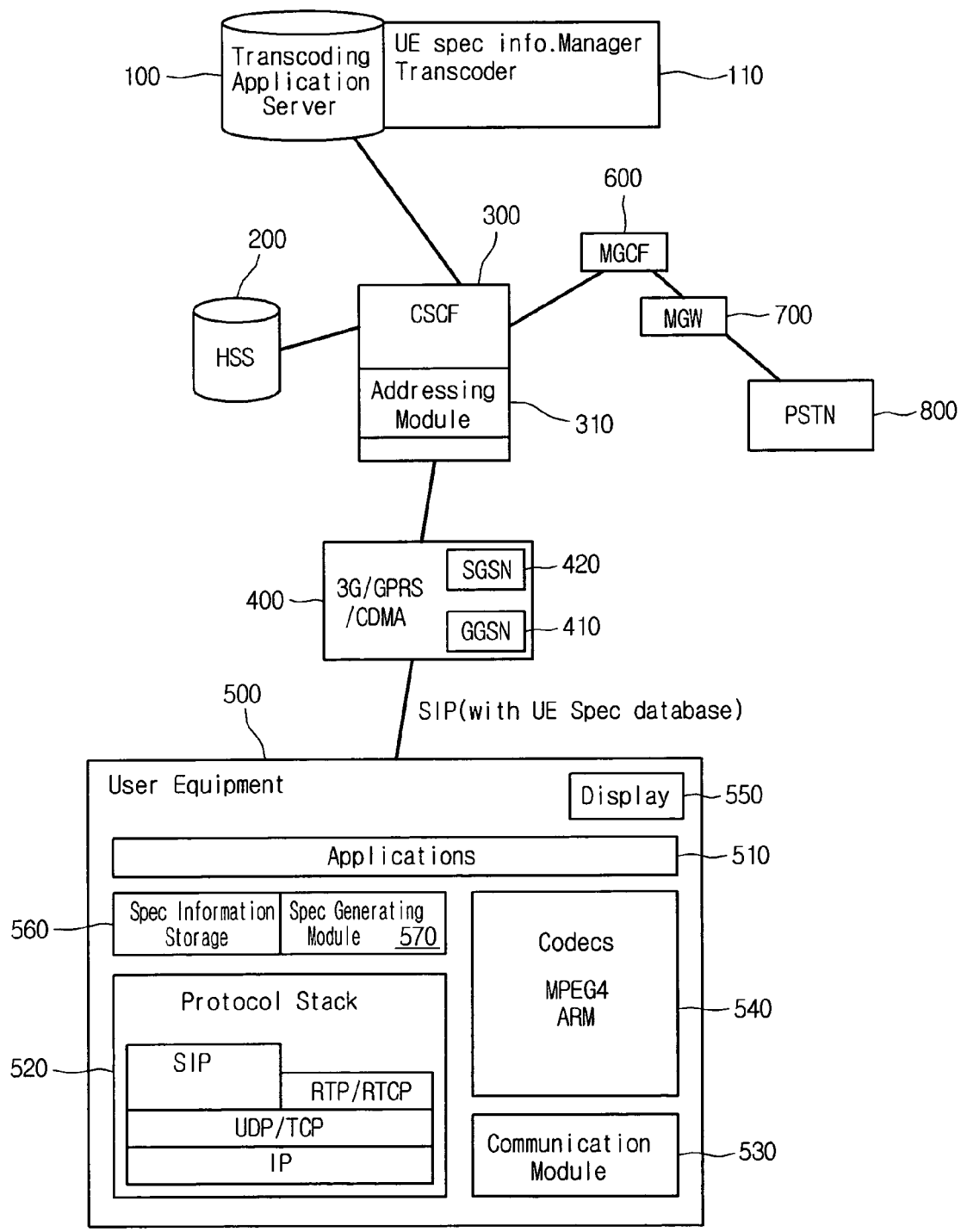
FIG. 3 is a diagram illustrating a configuration of an IMS system according to an embodiment of the present invention.

FIG. 3 is a diagram illustrating a configuration of a universal multimedia access system using an SIP according to an embodiment of the present invention. Referring to FIG. 3, the universal multimedia access system in the IMS environment according to the present invention includes a transcoding application server 100, an HSS 200, a CSCF 300, a mobile communication network 400, an UE 500, an MGCF 600, an MGW 700, and a PSTN 800.

The application server 100 is a transcoding application server and includes an UE spec information manager and transcoder 110. The CSCF 300 includes an addressing module 310.

The HSS 200 has a subscriber information and provides it according to a request, and the CSCF 300 performs an incoming gateway, a call control, a serving profile management and address handling function, and so on. The MGCF 600 manages the transmission control with a PSTN 800. The MGW 700 connects the MGCF 600 to the PSTN 800. When a wireless terminal intends to perform a high speed packet communication, the GGSN 410 acts as a gateway to connect the wireless switching network to the Internet network so as to enable the packet to pass through the wireless switching network, including a base station, and then connect to the general Internet network, such that a data communication with a destination is possible. The SGSN 420 traces a mobile node and is a channel through which it transmits/receives a packet to/from the GGSN.

In the IMS of FIG. 2, each of the terminals can be connected to different home networks. The terminals and the home networks are connected together through the GGSN 410 and the SGSN 420. In order for the transmission/reception with different terminals, a session has to be connected. After the session connection, the data transmission/reception are actually possible.

As illustrated in FIG. 3, the UE 500 further includes an application 510 related to the mobile communication, a protocol stack 520 for a series of control processes of communication control, a communication module 530 for data transmission/reception, a codec 540 for data encoding/decoding, a display 550, a spec information storage 560 storing the spec information of the corresponding UE so as to transmitting the spec information through the SIP, and a spec information generating module 570. The protocol stack 520 includes an SIP, an RTP/RTCP, an UDP/TCP, and IP.

In the IMS environment of FIG. 3, the UE 500 corresponding to the mobile terminal is connected to the CSCF 300 corresponding to an interface of the IP core network by using the GGSN 410 and the SGSN 420 of the existing mobile communication network. In the IP core network, the CSCF 300 interfaces with the application servers 100 for providing various applications and the HSS 200 for managing the user information in the database, thereby providing various services.

As described above, the SIP is a protocol used to connect the initial session, and it can transmit/receive information required between the UE of the transmitter side. When the transmitter side is first connected to the CSCF 300 via the SIP, the receiver side is also connected to the CSCF via the SIP and performs a necessary signaling. At this point, an UE spec of the receiver side can be further transmitted via the SIP. The UE spec can be expressed using a field that is previously defined by the standard. That is, the UE spec information is described in the predetermined field that is previously defined in the SIP according to the standard, and the spec information is analyzed in the transcoding application server 100. Based on the analyzed information, the spec of the corresponding terminal is known.

Compared with the system of FIG. 2, the system of FIG. 3 uses the information contained in the SIP, instead of reading the UE spec of the receiver side at the HSS 200. The remaining procedures are identical to those of the method using the HSS.

For this purpose, the UE 500 adds the its own spec information to the SIS and then transmits it. Therefore, the UE 500 further includes a spec information storage 560 storing the spec information of the corresponding UE, and a spec information generating module 570 for adding the spec information to the SIP.

Therefore, the UE 500 describes its own spec information into a predetermined field of the SIP by using its own spec information stored in the spec information storage 560 and then transmits it. As described above, based on the SIP with the UE spec information of the receiver side, the transcoding application server 100 identifies the UE spec and adaptively transcodes and transmits the multimedia.

Figure 4:
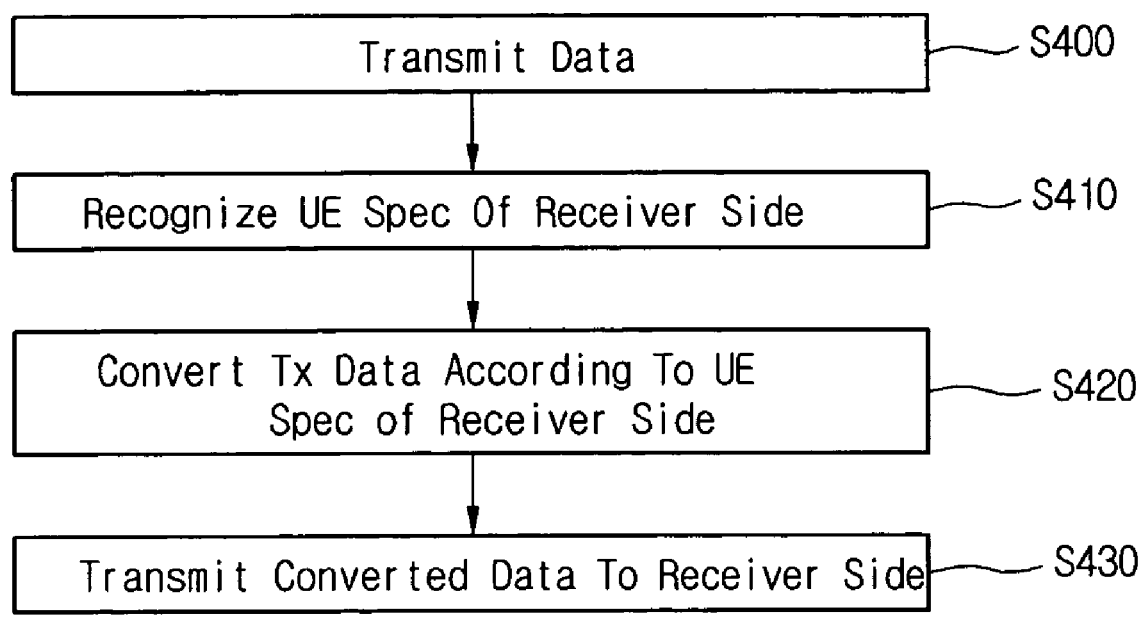
FIG. 4 is a flowchart of a multimedia access controlling procedure according to an embodiment of the present invention.

FIG. 4 is a flowchart illustrating the above-described control procedure of the universal multimedia access system according to an embodiment of the present invention. In operation S400, the UE of the transmitter side starts to transmit a multimedia resource to the UE of the receiver side.

In operation S410, the application server analyzes the UE spec information of the receiver side, which is read from the spec information database of the HSS, or analyzes the UE spec information of the receiver side, which is provided from the UE of the receiver side based on the SIP, and determines whether the transcoding of the corresponding multimedia resource is necessary or not. Here, the spec information may be a device information including a display resolution, a processor performance information, a moving picture spec including resolution and frame rate, and a combination thereof.

If the multimedia resource to be transmitted coincides with the UE spec of the receiver side, the transcoding is unnecessary. On the contrary, if not, the adaptive multimedia resource transcoding is necessary in the UE of the receiver side. When the transcoding is unnecessary, the corresponding multimedia resource does not need to pass through the transcoding application server. Therefore, in this case, the TX data is controlled to transmit to the UE of the receiver side without passing through the transcoding application server. That is, it is determined whether the transmitted UE spec of the receiver side is suitable for the TX data. If the transmitted UE spec is suitable and thus the transcoding is unnecessary, the TX package is addressed without passing through the application server. On the contrary, if the transmitted UE spec is unsuitable and thus the transcoding is necessary, the TX package is addressed such that it passes through the application server.

In operation S420, the TX data (multimedia resource) is transcoded according to the UE spec of the receiver side. In this operation, the multimedia resource is suitably transcoded according to the spec of the UE spec of the receiver side. For example, the frame rate or resolution of the moving picture is transcoded according to the UE spec of the receiver side.

In operation S430, the data (multimedia resource) transcoded suitably according to the UE spec of the receiver side is transmitted. As the result of this operation, the UE of the receiver side receives the data such as the moving picture transcoded according to its UE spec and displays it.

Various conversions corresponding to the above-described transcoding are provided. Hereinafter, the frame rate and resolution of the moving picture will be described as an example. First, assuming that the UE of the transmitter side transmits data at a QVGA (320×240) resolution, if the UE of the receiver side supports a QCIF (176×144) resolution alone, the UE of the receiver side needs a separate scaling-down operation because the received data cannot be decoded and displayed without modification. Also, a cost increases because unnecessarily large data is received. Accordingly, a resolution transcoding is performed to transcode the data to an appropriate resolution.

Then, in case where the UE of the transmitter side transmits the data because it can support a QVGA 30 fps moving picture recording, the performance of the UE of the receiver side merely supports a QVGA 7.5 fps, the UE of the receiver side decodes the moving data at ¼ performance. Therefore, the data is displayed four times slowly. In order to solve this problem, a frame rate transcoding is necessary to transcode a current frame rate to a suitable frame rate. Through this frame rate transcoding, the corresponding moving picture data can be normally reproduced and displayed in the UE of the receiver side.

The present invention provides the method that can realize the transcoding service by optimizing the frame rate or resolution of the multimedia resource according to various UE specs. Specifically, the present invention proposes the method that can reduce the data transmission cost and optimize the processing of the UE by using the spec information of each UE. The method can be suitably implemented in the environment of the multimedia resource transmission/reception system by proposing the real-time information exchange through both the method using the HSS and the method using the SIP. Although the moving service has been described above, the present invention can also provide methods that can be expanded to all multimedia resource.

[Method Using Plug-In Software]

Meanwhile, the following processes can be achieved from the UE spec information of the receiver side. That is, there is provided a system that can provide a component plug-in service that allows the corresponding decoder to be downloaded and then executed, when transmitting multimedia whose format requires a decoder that is not included in the UE, the system.

Figure 5:
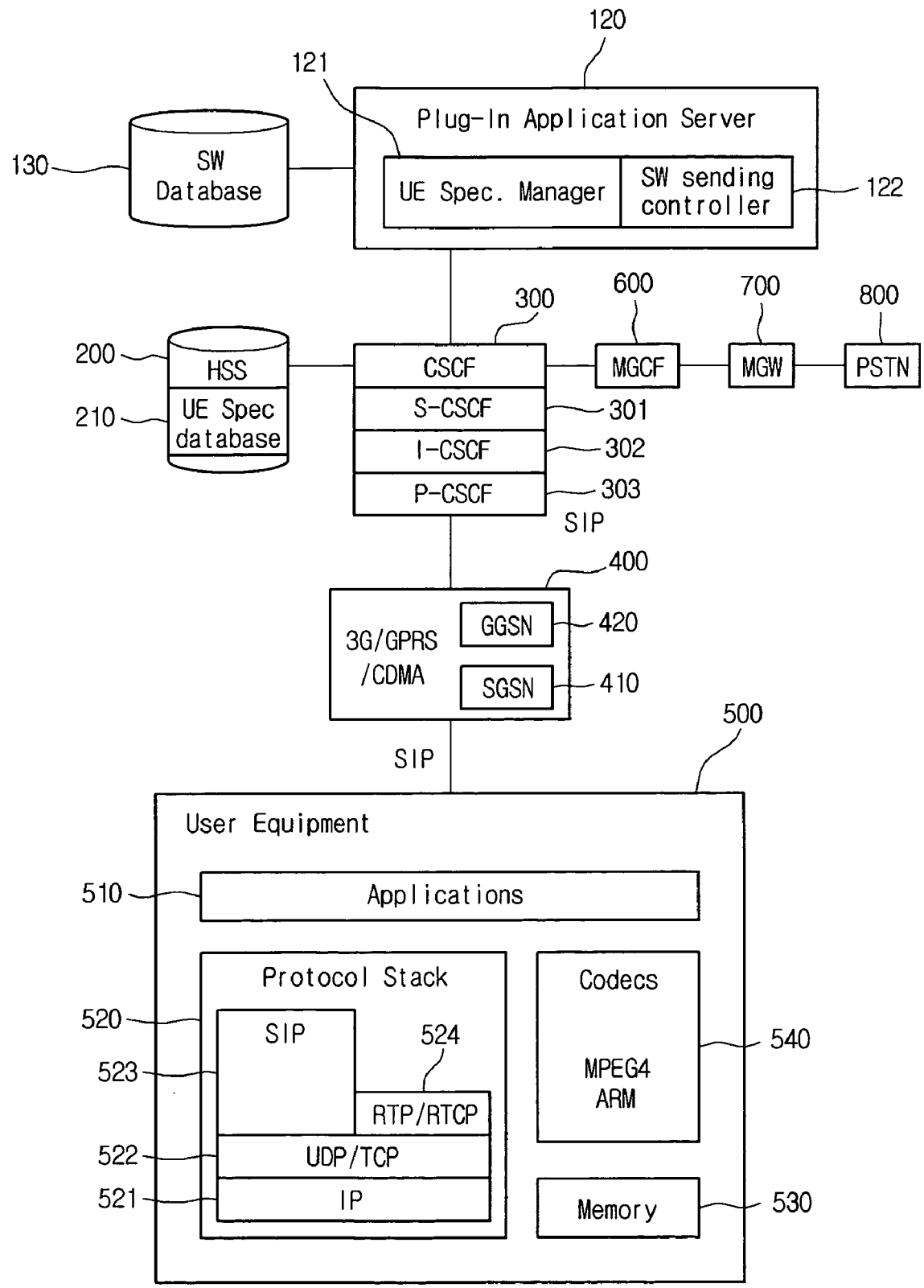
FIG. 5 is a diagram illustrating a configuration of an IMS system for implementing a plug-in service according to an embodiment of the present invention.

FIG. 5 is a diagram illustrating a configuration of an IMS system for implementing a plug-in service according to an embodiment of the present invention.

Referring to FIG. 5, a mobile terminal plug-in service apparatus according to an embodiment of the present invention includes a software database 130, a plug-in application server 120, and an HSS 200.

The software database 130 stores programs necessary for plug-in such as a codec. The software of the database 130 is managed based on each processor and resource applied to each terminal.

In the HSS 200, the spec information is managed in the UE spec database according to each terminal. Each terminal can be discerned by one ID, and the HSS 200 stores each terminal ID and each spec based on each ID. Therefore, when one user possesses several terminals, a separate spec based on each ID can also be stored.

The terminal spec information can include a main processor spec, a usable memory structure, and OS information. Even the same programs can be operated or not operated according to the processors, and even the same processors can be operated or not operated according to the memory environment. This is for the same reason that there is software that does not operate in PC when OS and hardware are different.

The software managed in the software database 130 is managed according to processor and resource conditions.

The plug-in server 120 reads the specification and the specification information of the UE 500 of the current receiver side from the HSS 200, and determines whether the plug-in is necessary and the program to be transmitted, based on the read information.

The plug-in server 120 managing the plug-in is connected to the software database 130 managing the plug-in software, and includes an UE spec manager 1221 and a software sensing controller 122. The UE spec manager 121 determines which software is to be transmitted to the terminal, and the software sending controller 122 transmits the determined software.

The UE spec manager 121 determines the plug-in software necessary in the UE spec of the receiver side according to the data format to be transmitted, and determines the plug-in software that is most suitable for the corresponding terminal among the software managed by the software database 130.

Since the remaining elements that are not described above have the same structure as that of the IMS standard, a detailed description thereof will be omitted.

Meanwhile, the plug-in service apparatus in the mobile communication system according to the present invention can be implemented in other forms by changing the element storing the UE spec information used to determine whether to execute the plug-in service or by changing the method of reading the spec information.

Figure 6:
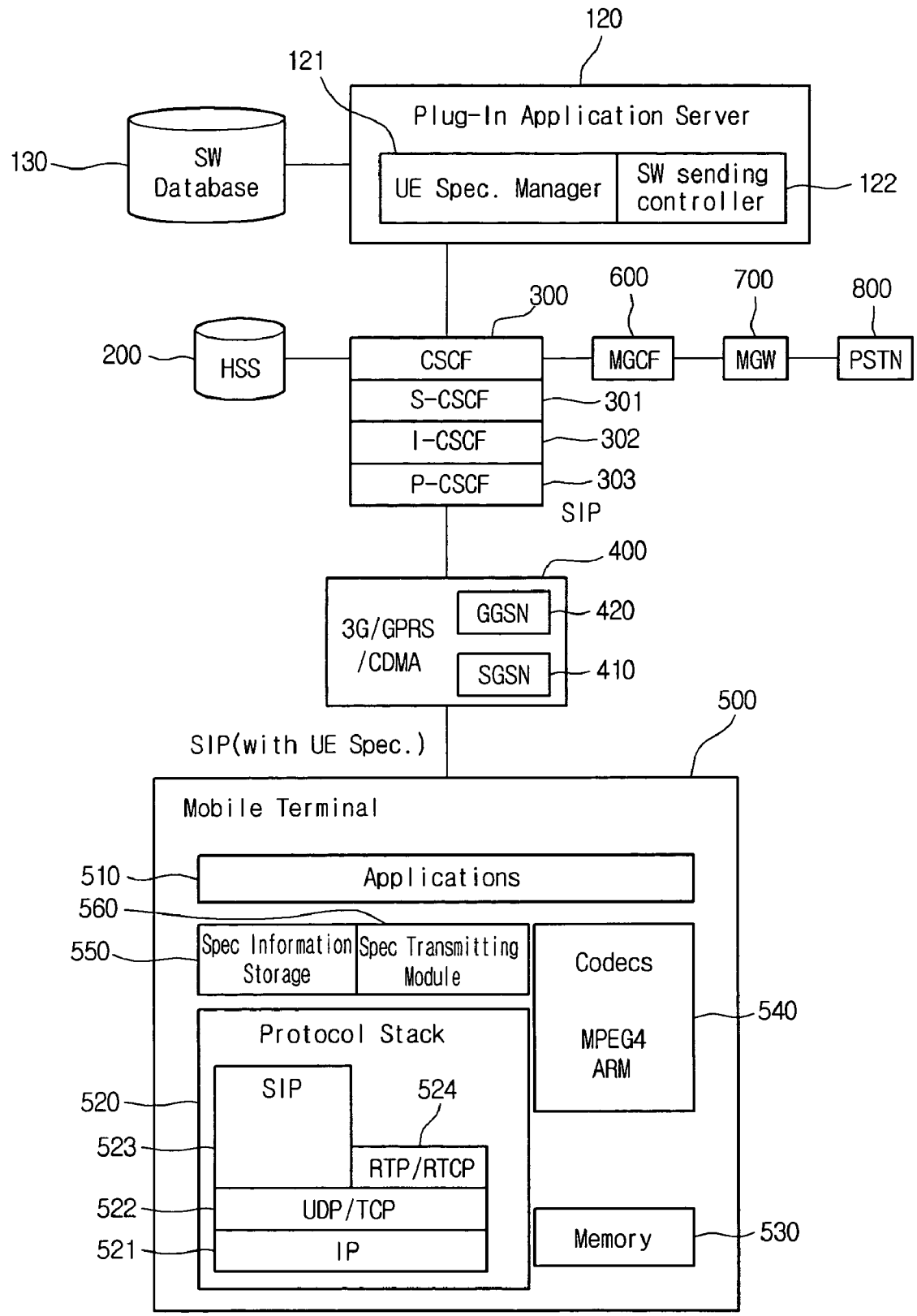
FIG. 6 is a diagram illustrating a configuration of an IMS system for implementing a plug-in service according to an embodiment of the present invention.

FIG. 6 is a diagram illustrating a configuration of an IMS system for implementing a plug-in service according to an embodiment of the present invention.

Referring to FIG. 6, when the UE of the transmitter side and the UE of the receiver side try to connect together through the initial SIP, the UE of the transmitter side and the UE of the receiver side transmit their spec and spec information over the SIP, and the plug-in server receives them. Then, the plug-in service is provided using the received information.

More specifically, the plug-in application server 120 managing the plug-in is connected to the software database 130 managing the plug-in software. The plug-in application server 120 includes the UE spec manager 121 and the software sensing controller 122. The UE specific manager 121 determines which software is to be transmitted using the UE spec, and the software sending controller 122 transmits the determined software.

The UE spec that the plug-in application server 120 will use is transmitted from the UE 500. Therefore, the HSS 200 does not need to separately store the spec information of each UE.

The UE 500 connects the session using the SIP prior to the data transmission/reception. Based on the given protocol, a specific text information can be transmitted within the SIP. The spec information of the UE 500 is added to this information and the plug-in application server 120 can use the information.

For this purpose, as illustrated in FIG. 6, the UE 500 has to include a module that can store the UE spec of the terminal itself and transmit the UE spec over the SIP.

For this purpose, the UE 500 includes a spec information storage 550 and a spec transmitting module 560. The spec information storage 550 stores a spec information used to determine a suitable plug-in software, and the spec transmitting module 560 transmits the spec information.

The spec information storage 550 includes a processor, an operating system (OS), a resource, and a codec information as its own spec information.

Also, the UE 500 further includes a memory space 530 for processing the plug-in software, and an application module 510 for receiving and executing the plug-in software.

Since the remaining elements that are not described above have the same structure as that of the IMS standard, a detailed description thereof will be omitted.

Hereinafter, the mobile terminal plug-in service method of the mobile communication system of the above embodiments will be described in detail.

The mobile terminal plug-in service method of the mobile communication system according to the present invention can be implemented by determining whether the server requires the plug-in when the UE transmits the spec information. Also, the method can be implemented by determining that the plug-in is necessary when the data has been already received, and thus requesting the plug-in to the server.

First, the mobile terminal plug-in service method implemented by determining whether the plug-in server requires the plug-in when the UE sends the spec information alone will be described below.

Figure 7:
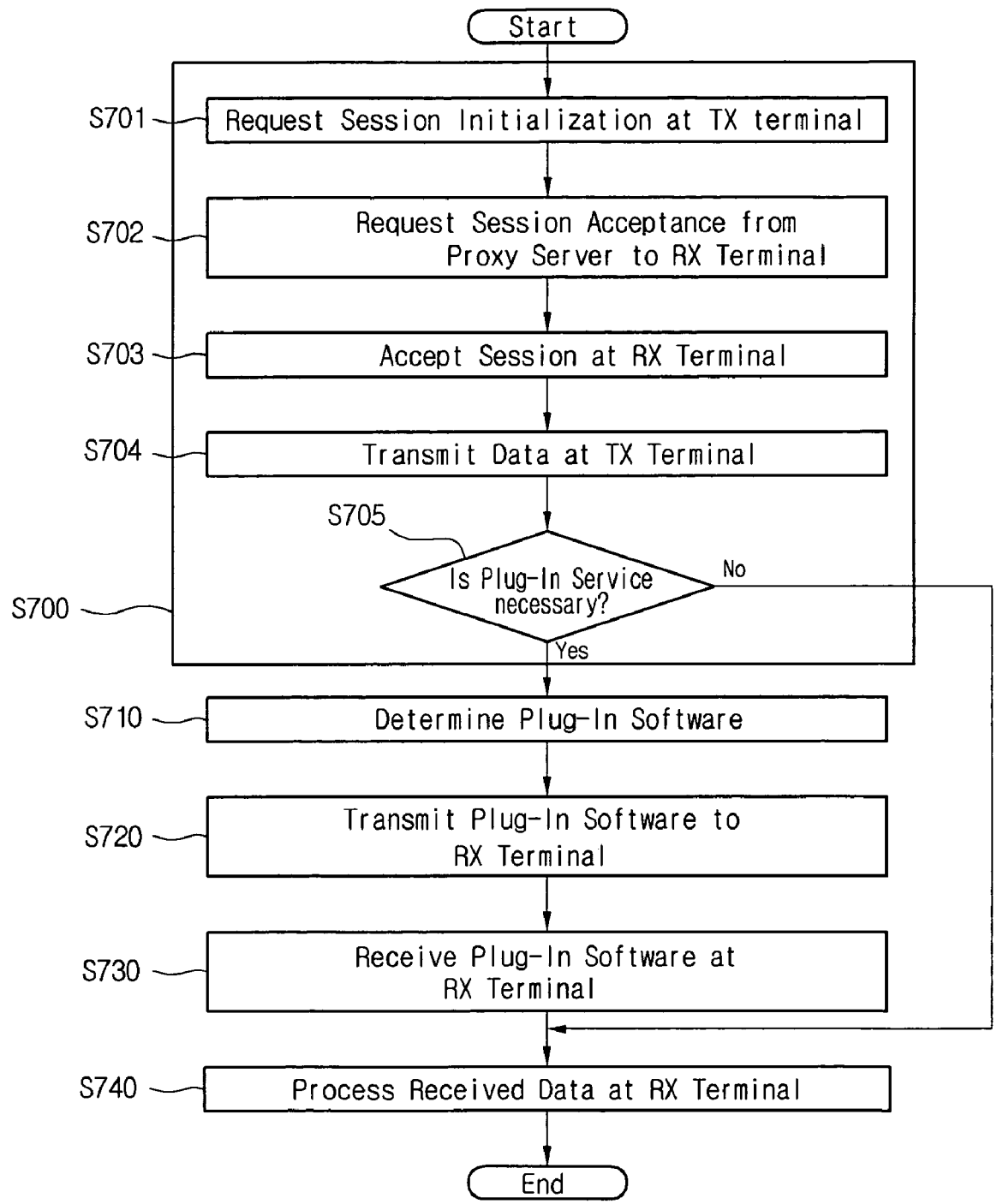
FIG. 7 is a flowchart illustrating a plug-in service method according to an embodiment of the present invention.

FIG. 7 is a flowchart illustrating a plug-in service method according to an embodiment of the present invention.

Referring to FIG. 7, in operation S700, the plug-in application server 120 determines whether or not a plug-in service needs to be provided to the UE 500 of the receiver side.

Hereinafter, the UE 500 illustrated in FIGS. 5 and 6 will be referred to as a receiving UE 500.

Operation S700 will now be described in detail.

In operation S701, in order to communicate with an opponent terminal, a transmitting UE designates the opponent terminal as a receiving UE 500 to request session initialization.

In operation S702, in response to the session initialization request of the transmitting UE, a proxy serve 303 requests the receiving UE 500 to accept a session.

In operation S703, in response to the session acceptance request of the proxy server 303, the receiving UE 500 permits the session acceptance when it is in a communication-possible state.

In operation S704, according to the session acceptance of the receiving UE 500, the transmitting UE transmits data for the receiving UE 500.

The plug-in application server 120 analyzes the UE spec received during the session setting and data transmitting process and data to be transmitted, to determine whether or not the plug-in service is needed. This will now be described in detail.

In order to determine the need for the plug-in service, the UE spec manager 121 of the plug-in application server 120 first analyzes the spec information of the receiving UE 500 and the format information of the data to be transmitted form the transmitting UE to the receiving UE 500.

The UE spec used in the determining of the need for the plug-in service may be spec information received from the receiving UE 500 during the session initialization process performed in response to the session request of the transmitting UE, or may be spec information read from the HSS 200, that is, a database managing the spec information of UE.

In operation S705, the UE spec manager 121 having analyzed the spec of the UE and the data to be transmitted determines whether or not the plug-in service needs to be provided for the receiving UE 500, in consideration of whether or not the data to be transmitted to the receiving UE 500 can be processed by the spec of the receiving UE 500.

Transmitting/receiving UEs using the IMS network generally has a variety of specs. That is, a built-in processor, an OS, a resource, and a codec has various versions. For this reason, while the transmitting UE can process image data and thus can transmit/receive the image data, a processor of the receiving UE having establishing a session with the transmitting UE may support only a voice/character message service.

In this case, when the transmitting UE is to transmit image data, the UE spec manager 121 cannot determine a suitable software that can support the plug-in service. At this time, the plug-in service may be performed on only the data format processible in the processor of the receiving UE 120, excepting the transmission of the corresponding image data.

Hereinafter, a description will be made about, for example, a case where the transmitting UE and the receiving UE all include a processor that can process a function serviced in the IMS network.

In operations S705 and S740, when the plug-in service is unnecessary, the plug-in application server 120 transmits a TX data to the receiving UE 500 through the IMS network and the receiving UE 500 processes data received from the transmitting user terminal.

In operations S705 and S710, when the plug-in service is necessary, the UE spec manager 121 searches the software database 130 and the receiving UE 500 determines plug-in software that is suitable for processing data received from the transmitting UE according to its processor and OS spec.

In operation S720, the software transmission controller 122 of the plug-in application server 120 transmits the suitable plug-in software to the receiving UE 500 through the IMS network.

In operation S730, the receiving UE 500 receives the suitable plug-in software. In operation S740, the receiving UE 500 performs the received plug-in software to process the data received from the transmitting UE, enabling the plug-in service for the mobile terminal.

A description has been made about the method where the plug-in serve judges the spec information of the mobile terminal to determines whether or not the receiving UE needs the plug-in service. Alternatively, after receiving data, the mobile terminal itself determines that the plug-in service is necessary and makes a request for the plug-in service to the plug-in server.

A plug-in service method may be performed through a process where the mobile terminal receives data and then determines that the plug-in service is necessary and makes a request for the plug-in service to the plug-in server through the IMS network. This plug-in service will now be described in brief.

First, the receiving UE determines the need for the plug-in service.

When the plug-in service is necessary, the receiving UE makes a request for plug-in software to the IMS network.

In response to the request for the plug-in software, the IMS network transmits the corresponding plug-in software to the receiving UE.

Upon receiving the plug-in software, the receiving UE executes the plug-in software, enabling the plug-in service in the mobile terminal.

This will now be described in detain with reference FIG. 8.

Figure 8:
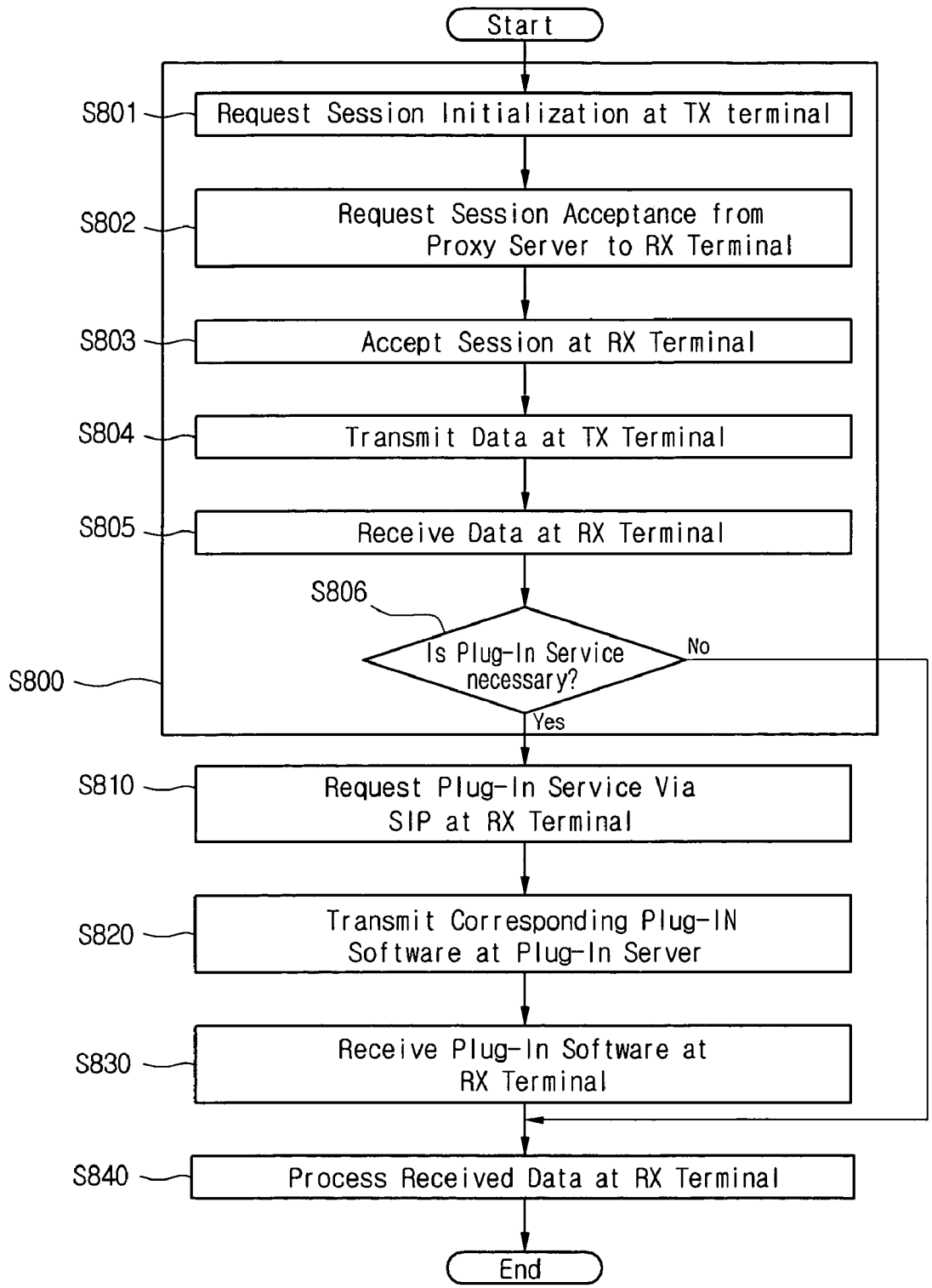
FIG. 8 is a flowchart illustrating a plug-in service method according to an embodiment of the present invention.

FIG. 8 is flowchart illustrating a plug-in service method according to another embodiment of the present invention.

Referring to FIG. 8, the receiving UE itself determines the need for the plug-in service in operation S800. Operation S800 will now be described in detail.

In operation S801, a transmitting UE requests session initialization through the proxy server 303.

In operation S802, in response to the session initialization request of the transmitting UE, the proxy serve 303 requests the receiving UE 500 to accept a session.

In operation S803, in response to the session acceptance request of the proxy server 303, the receiving UE 500 accepts a session when it is in a communication-possible state.

In operation S804, according to the session acceptance of the receiving UE 500, the transmitting UE transmits data to the receiving UE 500.

In operation S805, the receiving UE 500 receives the data from the transmitting UE. In operation S805, the receiving UE 500 analyzes whether the received data can be processed by its terminal spec to determine whether or not the plug-in service is necessary.

During the determination of the need for the plug-in service, the corresponding terminal spec may be the terminal spec information stored in the receiving UE 500.

In operations S806 and S840, when the received data can be processed by the receiving UE 500 and thus the plug-in service is unnecessary, the receiving UE 500 itself process the received data.

In operations S806 and S810, when the received data cannot be processed by the receiving UE 500 and thus the plug-in service is necessary, the receiving UE 500 makes a request for the plug-in service to the IMS network through the SIP.

In operation S820, the plug-in application server 120 receiving the plug-in service request searches plug-in software and transmits the searched plug-in software to the receiving UE 500. This operation is similar to the corresponding operation of FIG. 7 and thus its description will be omitted for conciseness.

In operation S830, the receiving UE 500 receives the plug-in software transmitted according to operation S820.

The receiving UE 500 executes the received plug-in software to process the received data, thereby making it possible to overcome the service limitation caused by the resource limitation.

As described above, the software downloaded from the plug-in server is stored in the memory of the mobile terminal and is executed. In this case, the receiving UE must beforehand designate a space for executing the plug-in software in the internal memory capable of actually executing a program. Otherwise, the essential software of the mobile terminal may be affected.

In some cases, the UE 500 of the receiver side stores the plug-in software in the large-capacity external memory. Then, the UE 500 loads the plug-in software from the external memory without downloading it again, and then executes the loaded plug-in software.

Figure 9:
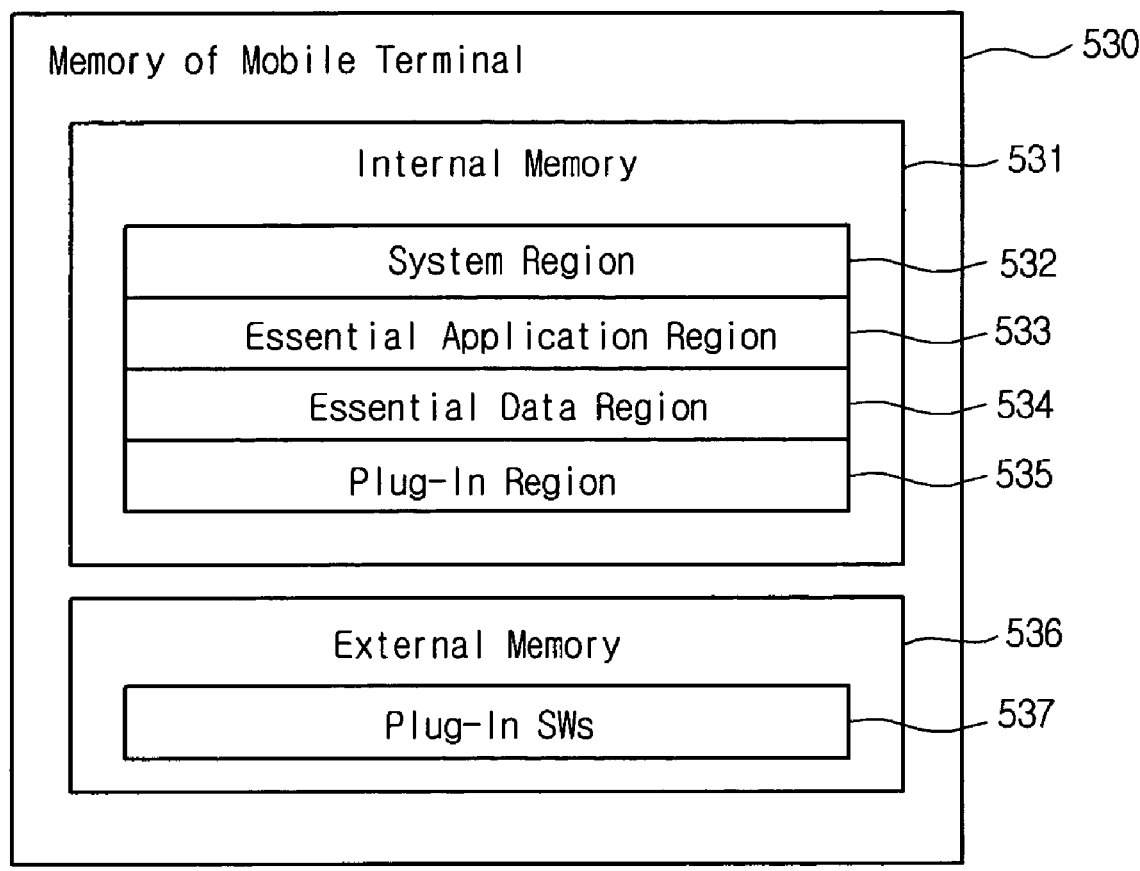
FIG. 9 is a diagram illustrating a memory structure of a mobile terminal for executing a plug-in service according to an embodiment of the present invention.

FIG. 9 is a diagram illustrating a memory structure of a mobile terminal for executing a plug-in service according to an embodiment of the present invention.

Referring to FIG. 9, the UE 500 includes an internal memory 531 and an external memory 536.

The internal memory 531 includes a system region 532, an essential application region 533, an essential data region 534, and a plug-in region 535 storing the plug-in software transmitted according to the present invention.

The external memory 536 includes a plug-in software region 537 storing the plug-in software, as well as a data storage region storing data required by the user.

According to the above-described structure, once-downloaded plug-in software stores the large-capacity external memory, and its related contents are stored in the spec information storage 550 of the UE. Therefore, the once-downloaded software can be loaded from the external memory and then executed without being downloaded again.

In the plug-in service apparatus and method of the mobile terminal according to the present invention, the plug-in service by means of the mobile terminal is possible in the mobile communication environment. Therefore, it is possible to overcome the service limitation that may occur due to the resource restriction of the mobile terminal, thereby providing various services.

The present invention can be applied to various services, such as the codec related plug-in, game, 3D, etc.

Further, the present invention can be applied to the expanded mobile communication terminals such as a mobile phone and a vehicle phone. Moreover, the present invention can be applied to all terminals operating in the IMS environment.

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. A plug-in service method performed at a user equipment, the method comprising:
   receiving contents data, wherein the contents data comprises media data;
   recording specification information into a predetermined field of a Session Initialization Protocol (SIP);
   transmitting the specification information to a server through the SIP;
   transmitting a message including a user equipment ID of the user equipment to the server;
   receiving a plug-in software from the server, the plug-in software being configured to be installed on the user equipment and process the contents data to complement a process for the contents data at the user equipment; and
   processing the contents data by executing the received plug-in software,
   wherein the server retrieves the specification information of the user equipment from database using the user equipment ID uniquely identifying the user equipment in a mobile wireless network, analyzes the retrieved specification information and the contents data based on the SIP to determine whether the user equipment needs the plug-in software for processing the contents data, and transmits the plug-in software to the user equipment when the user equipment needs the plug-in software, and
   wherein the specification information is selected from a group consisting of processer information, operating system information, resource information, and codec information.

2. A user equipment comprising:
   a module for receiving contents data, the contents data comprising media data;
   a specification storage for storing specification information;
   a specification generating module for generating and transmitting the specification information to a server, wherein the specification information is recorded into a predetermined field of a Session Initialization Protocol (SIP) and the specification information is transmitted through the SIP;

a module for transmitting a message including a user equipment ID of the user equipment to the server; and a module for receiving and executing a plug-in software transmitted from the server to process the contents data, wherein the server retrieves the specification information of the user equipment from database using the user equipment ID uniquely identifying the user equipment in a mobile wireless network, analyzes the retrieved specification information and the contents data based on the SIP to determine whether the user equipment needs the plug-in software for processing the contents data, and transmits the plug-in software to the user equipment when the user equipment needs the plug-in software, and wherein the specification information is selected from a group consisting of processer information, operating system information, resource information, and codec information.

* * * * *